(12) United States Patent
Gentz et al.

(10) Patent No.: US 8,720,675 B2
(45) Date of Patent: May 13, 2014

(54) BELT AS A TRACTION MECHANISM FOR BELT CONVEYORS OF AGRICULTURAL MACHINES

(71) Applicant: Arnold Jager Holding GmbH, Hannover (DE)

(72) Inventors: Hans Jurgen Gentz, Bad Salzdetfurth (DE); Sebastian Jager, Hanover (DE)

(73) Assignee: Arnold Jager Holding GmbH, Hannover (DE)

( * ) Notice: Subject to any disclaimer, the term of this patent is extended or adjusted under 35 U.S.C. 154(b) by 0 days.

(21) Appl. No.: 13/655,993

(22) Filed: Oct. 19, 2012

(65) Prior Publication Data

US 2013/0256101 A1 Oct. 3, 2013

(30) Foreign Application Priority Data

Oct. 20, 2011 (DE) .......................... 10 2011 116 633

(51) Int. Cl.
*B65G 15/34* (2006.01)
*B65G 15/42* (2006.01)

(52) U.S. Cl.
USPC ..................... 198/847; 198/844.1; 198/844.2; 198/846

(58) Field of Classification Search
USPC .................. 198/804, 844.1, 844.2, 846, 847; 474/253, 255, 256; 24/31 B, 31 F, 31 L
See application file for complete search history.

(56) References Cited

U.S. PATENT DOCUMENTS

| | | | | |
|---|---|---|---|---|
| 3,464,094 A * | 9/1969 | Mates | ............................ | 24/443 |
| 4,642,081 A * | 2/1987 | Balomenos | ................... | 474/253 |
| 4,705,495 A * | 11/1987 | Madion | ......................... | 474/255 |
| 6,345,925 B1 * | 2/2002 | Coleman | ......................... | 403/24 |
| 7,980,979 B2 * | 7/2011 | Jakob | ............................ | 474/253 |

* cited by examiner

*Primary Examiner* — Leslie A Nicholson, III

(74) *Attorney, Agent, or Firm* — Jennifer S. Stachniak; Robert W. Becker

(57) ABSTRACT

A belt as traction mechanism for conveyor bands of agricultural machines. A belt member of polymer reinforced with fabric plies has an upper step and a lower step that are interconnected in a region of overlap via connection locations that are spaced apart in the longitudinal direction of the belt. An inwardly disposed polymer layer is entirely absent in the region of overlap. The inner fabric plies of lower step and/or upper step extend into the region of overlap in a partial region that includes at least one connection location. The remaining fabric plies of upper step and lower step extend over the entire region of overlap, so that in the partial region the lower step and/or the upper step is provided with all of the fabric plies. Complementary tooth elements are provided on fabric plies that are disposed directly opposite one another in the region of overlap, and mesh with one another to effect interconnection of upper step and lower step.

8 Claims, 3 Drawing Sheets

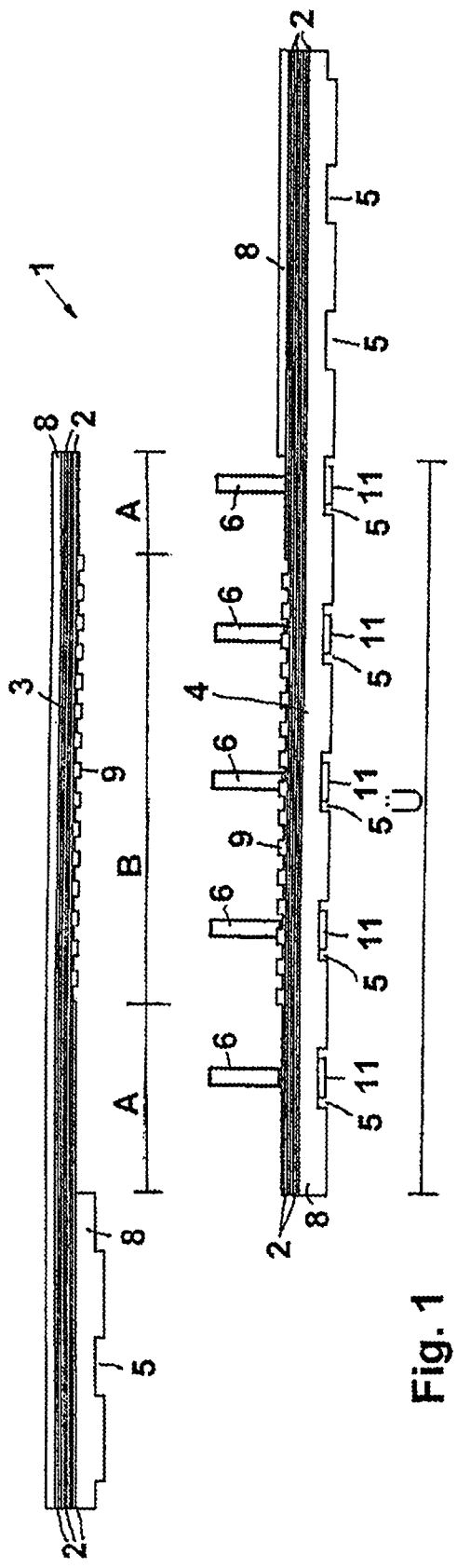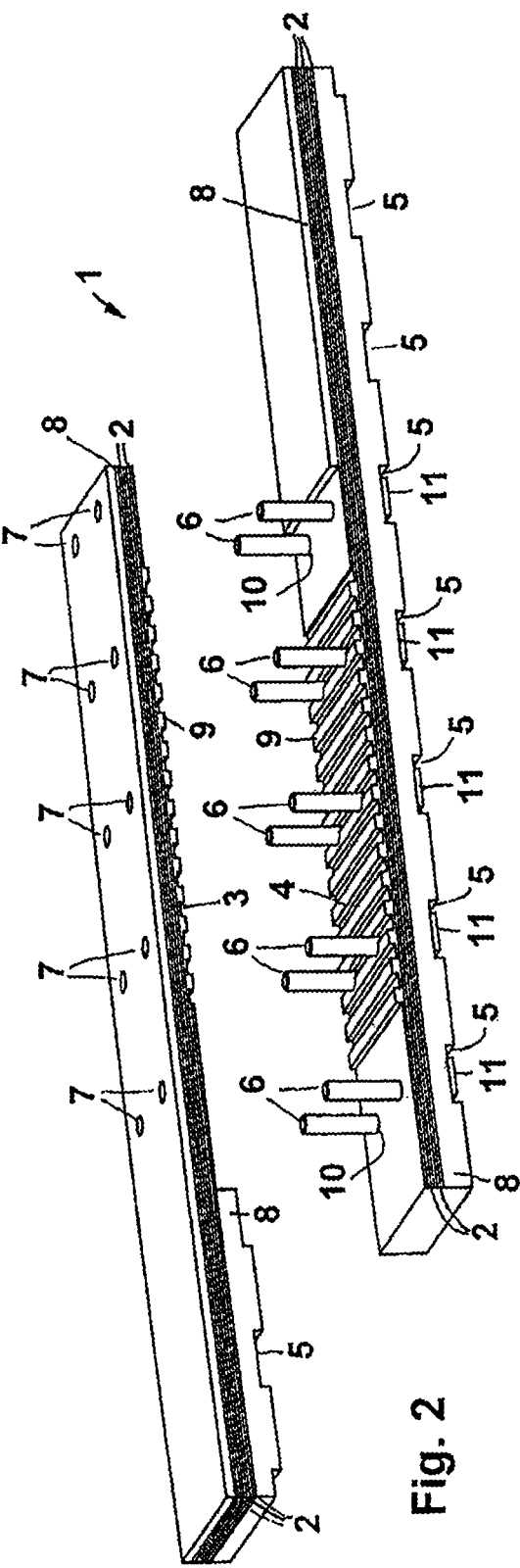
Fig. 1
Fig. 2

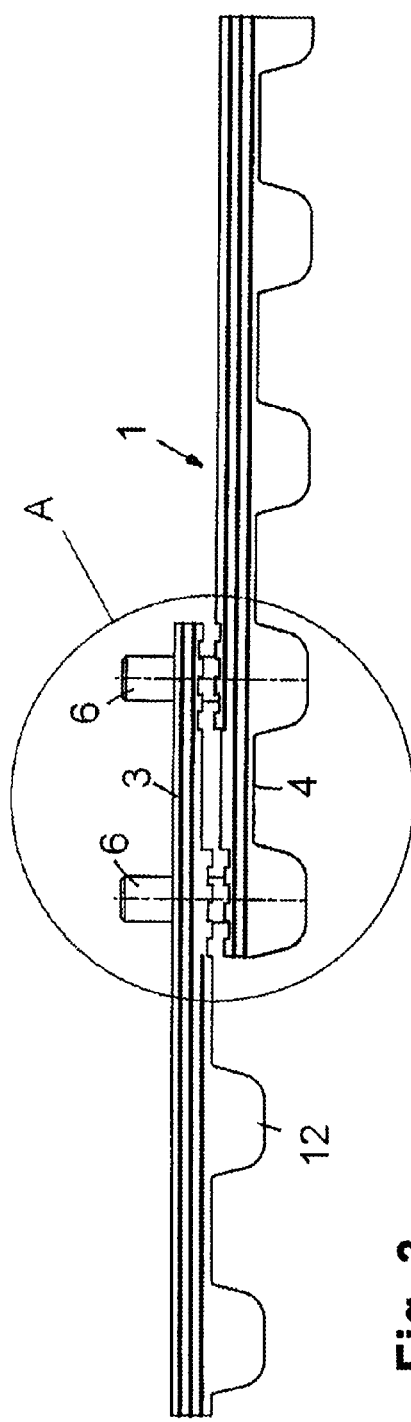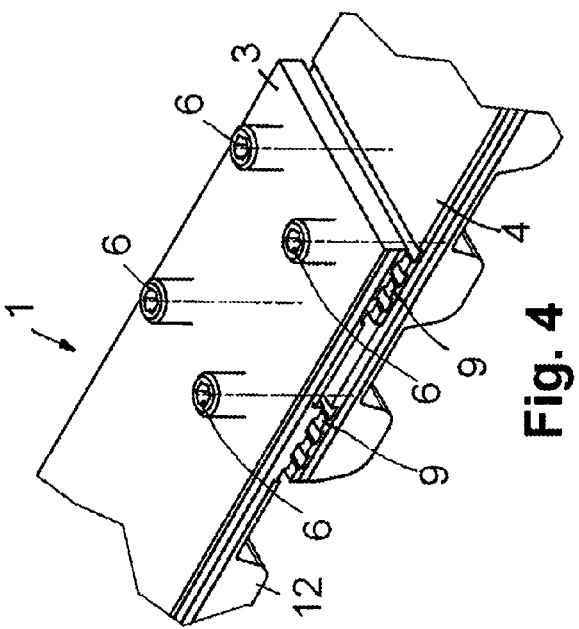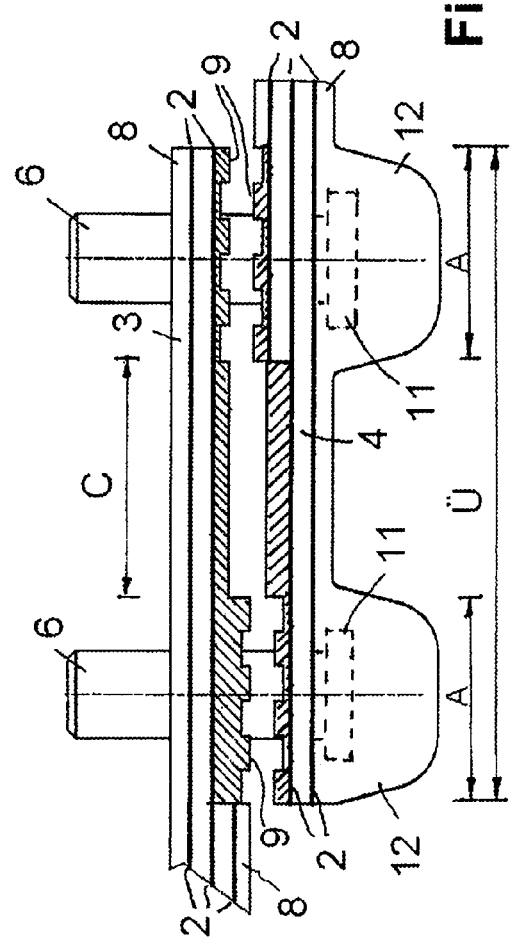
Fig. 3
Fig. 4
Fig. 5

BELT AS A TRACTION MECHANISM FOR BELT CONVEYORS OF AGRICULTURAL MACHINES

The instant application should be granted the priority dates of Oct. 20, 2011, the filing date of the corresponding German patent application 10 2011 116 633.9.

BACKGROUND OF THE INVENTION

The present invention relates to a belt as a traction mechanism for conveyor bands of agricultural machines of the belt have an upper step and a lower step respectively that, in a region of overlap, rest upon one another and are interconnected in a pull-resistant manner, whereby the belt is comprised of a polymer reinforced by a n fabric plies, where n=2 to 4, and the n fabric plies, on the outer sides of the belt are covered by a polymer layer, whereby in the region of overlap the inwardly disposed polymer layers are at least partially removed.

Conveyor bands that have belts as traction mechanisms are used, for example, in agricultural machines. Such conveyor bands generally have two or more belts that are disposed parallel to one another and are interconnected by transverse elements, e.g. bars or rods.

To be able to be used, the belts must exist in an endless configuration. Various procedures are known in the state of the art for producing such an endless configuration.

For example, it is known from DE 100 37 645 A1 to serrate the two ends of a belt in a comb-like manner, and to fit these serrated regions together, and then vulcanize them to make the belt endless.

In DE 297 16 333 U1 and DE 10 2006 022 011 B3, making the traction mechanism, which is embodied as a cam belt, endless is effected by means of a belt jointing mechanism. Various embodiments of such belt jointing mechanisms are frequently used to make the traction mechanisms endless for conveyor bands of agricultural machines.

DE 1 805 364 A discloses a method for making a conveyor band endless by stepping the two ends of the conveyor band over the entire width, thereby forming a region of overlap having an upper and a lower step. In this region of overlap, the two ends of the conveyor band are disposed one upon the other. The two stepped ends of the conveyor band thus complement one another to provide their overall thickness, and are then interconnected in a pull-resistant manner by a subsequent vulcanization.

As a drawback of this method, it is described that due to the interruption of the fabric reinforcing plies caused by the formation of the steps, losses of strength and load-carrying capacity at the connection location have to be reckoned with.

It is proposed in DE 1 805 364 A, for a conveyor band of rubber and having at least two fabric reinforcing plies with an intermediate rubber layer, to remove the intermediate rubber layer in the region of overlap and beyond, and to replace it with an insert of reinforcing fabric that is rubberized on both sides, and subsequently to post vulcanize this connection. The reinforcing fabric extends beyond the locations where the upper step and the lower step abut, as a result of which greater pulling forces can be taken up at the connection location. The conveyor band is bent or buckled at its guide rollers, as a result of which the upper and lower steps can bow at the abutment locations, so that ultimately only the additionally introduced fabric reinforcing ply transfers pulling forces.

U.S. Pat. No. 4,705,495 A discloses an emergency V-belt for motor vehicles. The two ends of the V-belt are stepped, thus forming a region of overlap having an upper and a lower step. Teeth are formed on the inner side of the upper step and of the lower step, which are spaced from one another by tooth gaps. For the connection of the belt ends, the teeth of the upper step can be pressed into the tooth gaps of the lower step, and vice versa. The connection is then effected by a screw connection of the upper and lower steps in the region of overlap. In so doing, the length of the emergency V-belt can be determined by using either the entire toothed region of the upper step and the lower step, or only a partial region thereof.

It is an object of the present invention to provide a belt as a traction mechanism for conveyor bands of agricultural machines that has a high static and dynamic strength in the region of overlap.

This object is inventively realized with a belt where in the region of overlap, upper step and lower step are interconnected in a pull-resistant manner by at least two connection locations that are spaced apart in the longitudinal direction of the belt and include thread or rivet members, whereby in the region of overlap the inwardly disposed polymer layers are entirely removed or absent, and the fabric plies of lower step and upper step that in the region of overlap are disposed directly opposite one another are provided with complementary tooth elements that, for the transfer of pulling forces, mesh with one another, and whereby the inner fabric plies of lower step and/or upper step extend into the region of overlap in a partial region that includes at least one connection location, while the remaining fabric plies of lower step and upper step extend over the entire region of overlap, so that the lower step and/or the upper step is provided with n fabric plies in the partial region.

SUMMARY OF THE INVENTION

Since pursuant to the invention the inner fabric ply of the lower step and/or of the upper step extend into the region of overlap in a partial region that includes at least one connection location, and since the remaining fabric plies of the lower step and of the upper step extend over the entire region of overlap, in this partial region 2n−1 fabric plies are disposed one above the other. As a result, nearly the entire static and dynamic strength of the undamaged belt is maintained in this neuralgic region. Thus, a bending at the guide locations of the belt during operation, which cannot be entirely avoided, is significantly reduced. At the same time, the toothing of the upper step and the lower step that is provided in the region of overlap contributes to a significant increase of the tensile strength in the region of overlap.

The threading or riveting provided in the region of overlap contributes to a secure meshing of the teeth.

Pursuant to a further advantageous embodiment of the invention, the tooth elements are disposed only in the region of the connection locations, while the regions disposed between them are smooth, i.e., are free of tooth elements. This configuration has the advantage that the tooth elements in the region of the connection locations are pressed particularly effectively together, while the smooth regions between the connection locations enable a sliding of the belt ends relative to one another in the direction-changing locations.

Further advantageous embodiments of the invention can be gleaned from the remaining dependent claims.

BRIEF DESCRIPTION OF THE DRAWINGS

The invention will be explained subsequently in greater detail with the aid of exemplary embodiments. The associated drawing shows:

FIG. 1 a side view of the region of overlap of a belt pursuant to a first exemplary embodiment of the invention, FIG. 2 a perspective view from above at an angle onto the illustration of FIG. 1, FIG. 3: a side view of the region of overlap of a belt pursuant to a second exemplary embodiment of the invention;

FIG. 4: a perspective view at an angle from above onto the illustration of FIG. 3, FIG. 5: an enlarged view of the encircled portion A in the illustration of FIG. 3, and FIG. 6: an illustration pursuant to FIG. 5 of a further exemplary embodiment of the present invention.

DESCRIPTION OF SPECIFIC EMBODIMENTS

Figure 6:
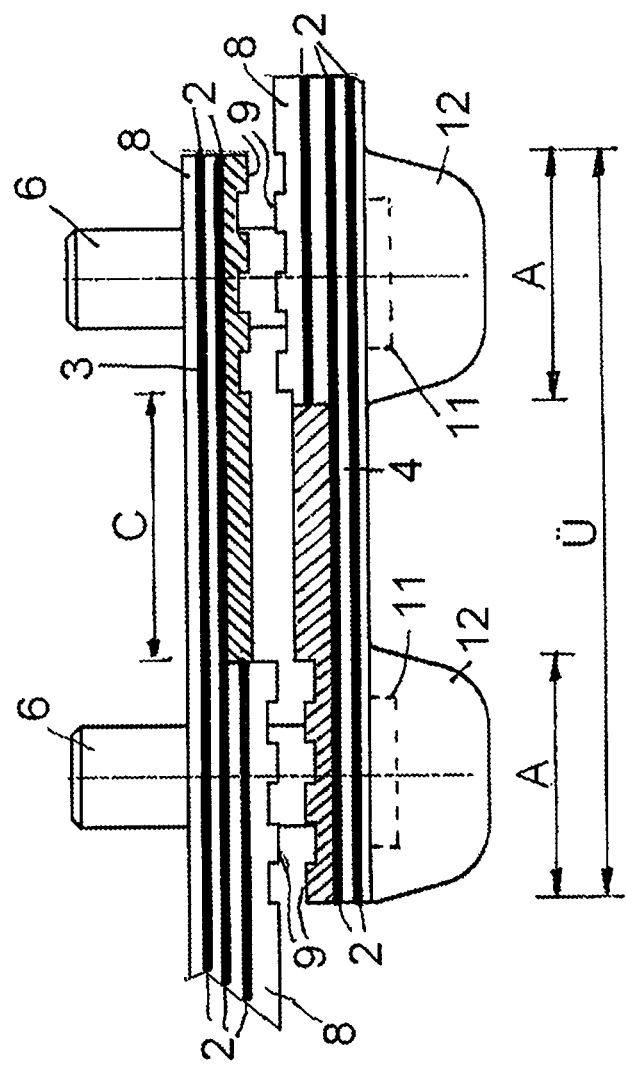

In the following exemplary embodiments, the same reference numerals are used for the same components or for components that act in the same manner.

The belts 1 illustrated in the drawing are used as traction mechanisms for conveyor bands of agricultural machines. Such conveyor bands generally have two or more belts 1 that extend parallel to one another, and that are interconnected, e.g. by means of cross members.

The belts 1 of all of the embodiments are comprised of a cross-linked polymer that is reinforced with fabric plies, and that have three fabric plies 2, which are respectively separated from one another by rubber layers and are covered on the outer sides of the belt 1 by means of a polymer layer 8. To produce their endless configuration, the belts 1 are provided with a region of overlap Ü. In this region of overlap Ü, the two ends of the belts 1 have a stepped configuration such that at one end an upper step 3 exists, and at the other end a lower step 4 exists.

The belt 1 illustrated in the exemplary embodiment of FIGS. 1 and 2 is embodied as a flat belt. On its underside, the belt has grooves 5 that are uniformly spaced apart and that in the region of overlap Ü serve to accommodate anchor plates 11 which are respectively weld-connected to two threaded bolts 6 that are spaced from one another; the anchor plates extend substantially over the entire width of the belt 1. The threaded bolts 6 extend through holes 10 that are provided in the lower step 4 and holes 7 that are provided in the upper step 3. Completion of the threaded connection between the upper step 3 and the lower step 4 is then effected by threading nuts onto the threaded bolts 6, which is not shown in the drawing.

With the exemplary embodiment of FIGS. 1 and 2, to form the upper step 3 and the lower step 4, in the region of overlap Ü the inwardly disposed, outer polymer layers 8 of the belt 1 are entirely removed. Furthermore the respectively inwardly disposed fabric plies 2 of the upper step 3 and the lower step 4 extend into the region of overlap Ü in a partial region A. In these partial regions A, five fabric plies 2 are thus disposed one over the other, whereas between the ends of the inner fabric plies 2 of the upper step 3 and the lower step 4, an intermediate space B is formed in which four fabric plies 2 are disposed one above the other. In the intermediate space B, the inner fabric plies 2 that are missing there are replaced by tooth elements 9 that are vulcanized onto the inner side of the upper step 3 and of the lower step 4. In the illustrated embodiment, these tooth elements 9 are formed by strips that are oriented transverse to the longitudinal extension of the belt 1, whereby the strips of the upper step 3 and of the lower step 4 are configured such that they interengage in a positive or interlocking manner. As a consequence of this toothing of the upper step 3 and lower step 4 in the intermediate space B, the tensile strength of the belt 1 is increased in the region of overlap Ü. The tooth elements 9 can also have other geometries. The important thing is that they be able to take up pulling or tensile forces in the longitudinal direction of the belt 1.

The belts 1 illustrated in the exemplary embodiments of FIGS. 3 to 6 are embodied as cam or lug belts. In agricultural machines, such cam belts extend about driven cam wheels or cam wheels that are carried along. On their underside, these belts have cams or lugs 12 that positively engage the cam wheels of the agricultural machines in order to drive the belt 1.

In the region of overlap Ü, which in this embodiment includes two connection locations 6, vulcanized into the associated cams 12 are anchor plates 11, as shown in dashed lines in FIGS. 5 and 6. These anchor plates 11 extend substantially over the entire width of the belt 1, and are respectively provided with two spaced-apart threaded bolts 6, which are welded to the anchor plates 11. The threaded bolts 6 extend through holes that are provided in the upper step 3 and are not visible in the drawing. Completion of the threaded connection between upper step 3 and lower step 4 is then effected by threading nuts onto the threaded bolts 6, which is not shown in the drawing.

With the exemplary embodiment of FIGS. 3 to 5, to form the upper step 3 and lower step 4, in the region of overlap Ü again the inwardly disposed polymer layers 8 of the belt 1 are entirely removed. Furthermore, the inwardly disposed fabric ply 2 of the lower stage 4 extends into the region of overlap Ü in a partial region A. Thus, in this partial region A five fabric plies 2 are disposed one above the other. In the upper step 3, the inner fabric ply 2 ends prior to the region of overlap Ü, in other words, does not extend into the region of overlap. Of course, the inner fabric ply 2 of the upper step 3 could also be guided into the region of overlap Ü in a partial region A, as is illustrated for the lower step 4. As a result, the flexibility of the connection location is somewhat reduced; however, in return the tensile strength is increased.

In FIG. 5, the polymer layers that have the tooth elements 9 and that are subsequently vulcanized on are emphasized with a cross-hatching. It can be seen from this illustration that prior to the application of these layers, the inwardly disposed polymer layers 8 of the upper step 3 and of the lower step 4, as well as the inwardly disposed fabric plies of the upper step 3 and of the lower step 4, are partially removed. The tooth elements 9 are provided only in the region of the connection locations, whereas the region C disposed therebetween has a smooth configuration, in order at that location to have as little friction as possible.

The exemplary embodiment of FIG. 6 differs from that of FIGS. 3 to 5 in that the inwardly disposed polymer layer 8 of the lower step 4 and of the upper step 3 extends into the region of overlap Ü in a partial region A, which includes at least one connection location, and in the remainder of the region of overlap Ü is removed. The polymer layers that are subsequently vulcanized on are similarly illustrated with cross-hatching in the region of overlap Ü in FIG. 6. It can be seen from this illustration that the tooth elements 9 in the partial regions A are formed in the polymer layer 8. These tooth elements 9 mesh with tooth elements 9 that are complementary thereto and are vulcanized onto a directly oppositely disposed fabric ply 2 of the respectively other steps 3, 4.

The specification incorporates by reference the disclosure of German 10 2011 116 633.9 filed Oct. 20, 2011.

The present invention is, of course, in no way restricted to the specific disclosure of the specification and drawings, but also encompasses any modifications within the scope of the appended claims.

The invention claimed is:

1. A belt as traction mechanism for conveyor bands of agricultural machines, comprising:
   a belt member comprised of a polymer reinforced with n fabric plies, wherein n=2 to 4, further wherein said belt member has a first end that forms an upper step and a second end that forms a lower step, wherein said upper step and said lower step are configured for an overlapping, pull-resistant interconnection in a region of overlap Ü via at least two connection locations to form a completed belt, further wherein said at least two connection locations are spaced apart in a longitudinal direction of said belt and include thread or rivet members, further wherein in said region of overlap Ü an inwardly disposed polymer layer is entirely absent up to one of said fabric plies in both said upper step and said lower step, further wherein an inwardly facing one of said fabric plies of at least one of said upper step and said lower step extends partially into said region of overlap Ü in a partial region thereof that includes at least one of said connection locations, and wherein remaining ones of said fabric plies of said upper step and said lower step extend over the entire region of overlap Ü, so that the at least one of said upper step and said lower step is provided with n fabric plies in said partial region; and
   complementary tooth elements provided on ones of said fabric plies of said upper step and said lower step that are disposed directly opposite one another in said region of overlap Ü, wherein said tooth elements are configured to mesh with one another to effect said interconnection of said upper step and said lower step and to effect a transfer of pulling forces.

2. A belt according to claim 1, wherein said tooth elements are disposed only in a region where said connection locations are disposed, and wherein regions disposed therebetween are smooth.

3. A belt according to claim 1, wherein ends of respectively inwardly facing ones of said fabric plies of said lower step and said upper step are spaced from one another by an intermediate space B, and wherein for a transfer of pulling forces in the longitudinal direction of said belt, ones of said complementary tooth elements extend from said upper step and said lower step into said intermediate space.

4. A belt according to claim 1, wherein said inwardly disposed polymer layer of said lower step and said upper step extends partially into said region of overlap Ü by the amount of a partial region that includes at least one of said connection locations, further wherein said inwardly disposed polymer layer is absent in the remainder of said region of overlap Ü, and wherein in said partial region, tooth elements are formed in said polymer layer that mesh with toothed elements that are complementary thereto and that are formed in one of said fabric plies of the respectively other step that is disposed directly opposite.

5. A belt according to claim 4, wherein said inner one of said fabric plies of said lower step and said upper step extends partially into said region of overlap Ü in said partial region, while the remaining fabric plies of said lower step and said upper step extend over the entire region of overlap.

6. A belt according to claim 1, wherein said tooth elements are strips that are oriented transverse to the longitudinal direction of the belt.

7. A belt according to claim 1, wherein said tooth elements are vulcanized onto said fabric plies.

8. A belt according to claim 1, wherein each of said connection locations is comprised of threaded bolts or rivet shafts that are spaced from one another in a direction transverse to the longitudinal direction of the belt, and wherein said threaded bolts or said rivet shafts are interconnected by a common anchor plate that extends over substantially the entire width of said belt.

* * * * *